March 2, 1937.　　　J. C. LOWRY ET AL　　　2,072,590
JIGSAW
Filed Nov. 1, 1933　　　2 Sheets-Sheet 1
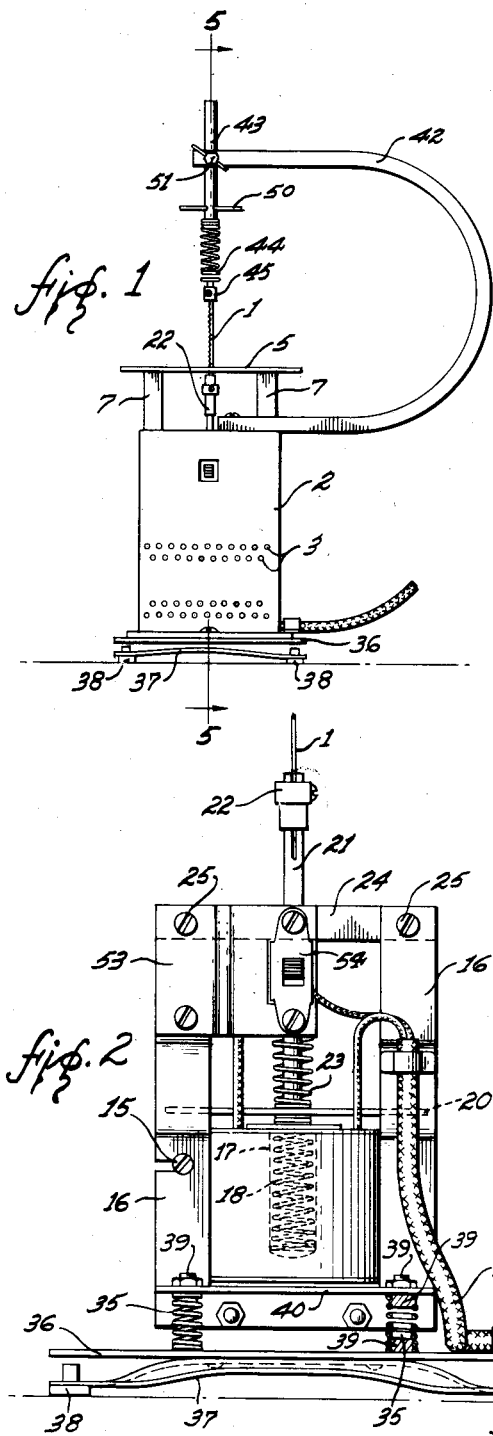
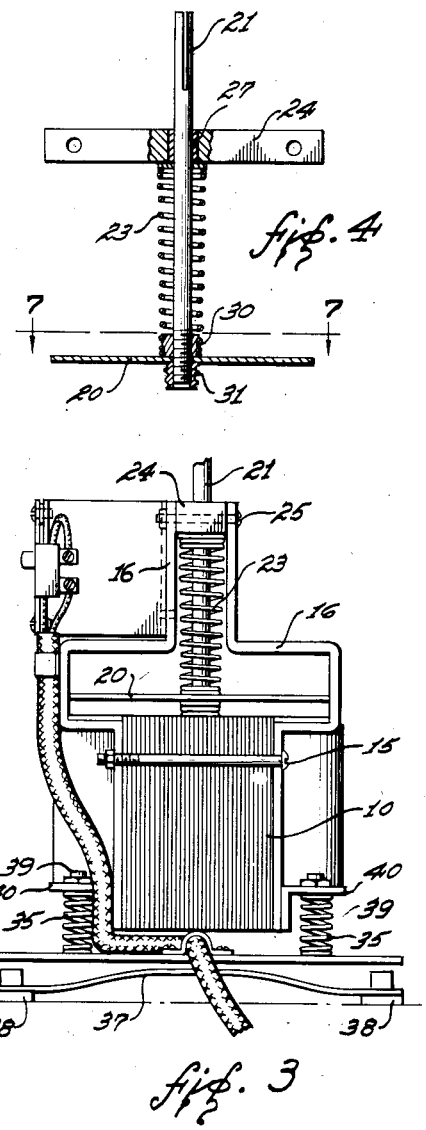
INVENTOR.
JULIUS C. LOWRY.
ORA M. RYBOLT.
BY
ATTORNEY.

March 2, 1937.  J. C. LOWRY ET AL  2,072,590
JIGSAW
Filed Nov. 1, 1933   2 Sheets-Sheet 2
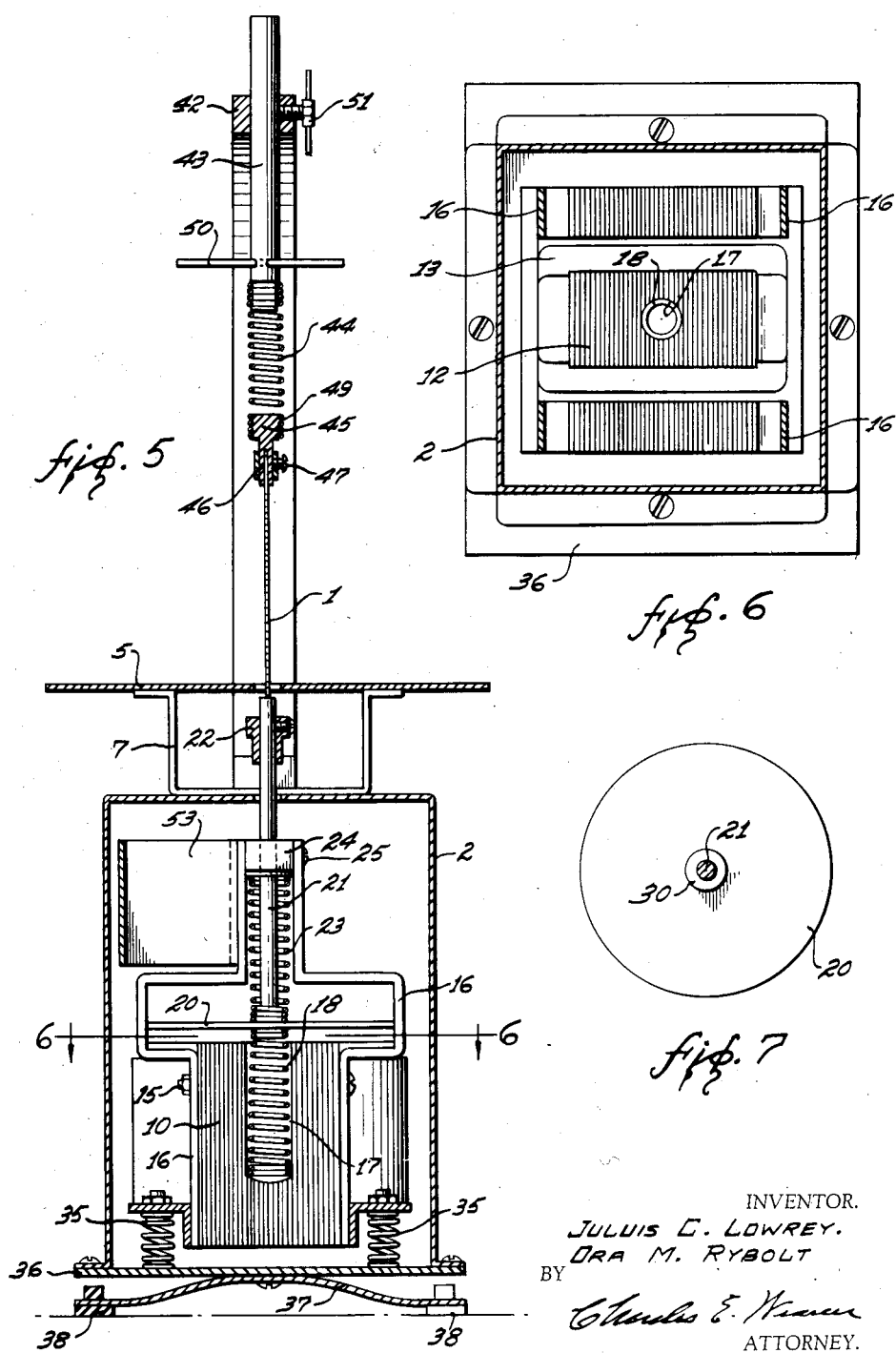
INVENTOR.
JULIUS C. LOWREY.
ORA M. RYBOLT
BY
ATTORNEY.

Patented Mar. 2, 1937

2,072,590

UNITED STATES PATENT OFFICE 2,072,590

JIGSAW

Julius C. Lowry and Ora M. Rybolt, Detroit, Mich., assignors to Magnetic Tool Company, Inc., Detroit, Mich., a corporation of Michigan Application November 1, 1933, Serial No. 696,906

2 Claims. (Cl. 143—70)

This invention relates to electrically operated mechanism for reciprocating tools and more particularly to such mechanism for use in reciprocating a jig saw.

One of the objects of the invention is to provide a new and improved mechanism for reciprocating a tool.

Another object of the invention is to provide a device of the above mentioned character having a new and improved arrangement of the operating parts thereof.

Another object of the invention is to provide magnetically operated mechanism for use with alternating current for actuating a saw blade and to provide new and improved means for effecting a synchronized relation between the saw movement and the alternating impulse of the current.

Another object of the invention is to provide a device of the above mentioned character in which the tool is spring suspended to be actuated in synchronism with an alternating current, energizing a magnet, and in which the magnet is also spring suspended in a manner so as to enter into the synchronized relation between the fluctuations of the current and the spring suspended tool.

More specifically it is an object of the invention to provide a reciprocating magnetically operated tool for synchronized operation with an alternating current and to provide a new and improved arrangement of resilient means arranged to cooperate with the magnet to acquire a desired stroke of the saw while maintaining the saw movement synchronized in relation to the fluctuations of the current.

These objects and the several novel features of the invention are hereinafter more fully described and claimed and the preferred form of construction by which these objects are attained is shown in the accompanying drawings in which—

Fig. 1 is a side view shown in elevation of a magnetic saw embodying features of the invention.

Fig. 2 is a view shown in side elevation of the magnetic and cooperating parts removed from the housing.

Fig. 3 is a view shown in elevation of Fig. 2 taken at right angles thereto.

Fig. 4 is a view of the armature and its cooperating parts disassociated from the magnet.

Fig. 5 is a view shown in vertical cross section taken along the line 5—5 of Fig. 1.

Fig. 6 is a view shown partly in cross section and partly in elevation taken along the line 6—6 of Fig. 5.

Fig. 7 is a view shown partly in cross section and partly in elevation taken along the line 7—7 of Fig. 4.

Referring to the drawings by characters of reference the saw blade 1, illustrated as the tool in this instance, is actuated by a magnet and a plurality of springs coacting with the magnet and its armature to maintain the saw in a state of reciprocatory vibration. Some of the springs directly support the saw blade in a manner so that the saw blade is resiliently suspended. Other springs are employed to support the magnet, and the entire structure including the work supporting table is spring supported. The magnet and its cooperating parts are contained within a housing 2 in which is provided a number of air holes 3 for permitting the escape of any heat which might be generated in the core of the magnet. A work supporting table 5 is mounted on top of the housing 2 by a bracket 7 and is provided with an opening through which the saw blade 1 extends.

The magnet comprises the usual core indicated in general at 10 and a coil (not shown) associated therewith. The core 10 is formed in this instance of a plurality of laminated plates clamped together by bolts 15 which extend therethrough. Any desired core construction may be used, a core formed by a plurality of laminated plates being preferable since, as well known, less heat is generated in such cores when employing alternating current. As shown in Fig. 6 the laminated plates are slotted in two places and around the central section 12 thus formed the coil of the magnet is wound. The coil may consist of a suitable gauge wire having a suitable number of turns. The numeral 13 designates a strip of insulation which is positioned over the coil. It will be seen that the bolts 15 which clamp the laminated plates 10 together also clamp these plates to the upright standard 16 of the frame.

A recess 17 is provided in the central section 12 of the core 10 to receive a tapered coil spring 18. The diameter of the bored recess is preferably such that the lower and larger end of the spring fits tightly therein to prevent it from turning in the recess. Thus when a torque is exerted on the blade 1 such as by turning the work the armature and its shaft will resist the tendency to turn with the work.

The armature includes a plate 20 threaded on the shaft 21 and the opposite end of the shaft is slotted to receive one end of the saw 1 which is held by the clamp 22. A second spring 23 is provided and between this spring and the spring 18 the armature plate 20 is spring mounted in spaced relation to the magnet. A cross bar 24 is fixed to the standards 16 by means of bolts 25 and the shaft 21 extends through an opening provided in the cross bar with the upper end of the spring 23 bearing against the cross bar. Preferably the cross bar 24 is provided with a suitable bearing material 27 in which the shaft 21 is held in alignment while being free to reciprocate. As shown, the cross bar 24 serves as a bearing for the spring 23 and is detachable from the standards. When the connecting cross bar 24 is in position, the springs 18 and 23 are placed under tension between the bar and the core of the magnet.

A U-shaped supporting arm 42 is mounted on the housing 2 and this arm is provided with an opening to receive a shaft 43. As heretofore mentioned the saw 1 is spring mounted at its upper end as well as at its lower, and to the upper end, the shaft 43 and saw are resiliently connected by means of the spring 44. A retainer 45 having a slot 46 is provided for receiving the upper end of the saw which is clamped therein by means of a set screw 47. This retainer 45 is also threaded as at 49, in Fig. 5, to receive the lower end of the spring 44 which is threaded thereon. The shaft 43 is also provided with a threaded end on which the upper end of the spring 44 is threaded. A grip 50 is provided on the shaft 43 by which it may be raised or lowered. Raising or lowering the shaft 43 also changes the resiliency of springs 44, 18 and 23.

In order to spring suspend the saw blade 1 and to do so in a manner such that it may be reciprocated efficiently the spring 23, as heretofore mentioned, is a stronger spring than the spring 18. This difference between the springs 18 and 23 is adjustable however by adjusting the tension of the spring 44 on the upper end of the saw blade. It will be seen that by raising the shaft 43, the difference between the springs 18 and 23 may be eliminated or be changed to any desirable difference in tension. It will further be seen that through changing the tension of the spring 44, the normal spaced relation of the armature plate 20 with respect to the magnet 10 is variable. Variation of the tension of the spring 44 also provides for adjusting the stroke length of the saw.

Referring to Fig. 4, in which the structure of the armature and its cooperating parts are shown in detail, the spring 18, it will be seen, is a tapered spring with the smallest end at the armature plate 20, the purpose being to distribute the force exerted on the spring throughout its length to prevent the coils of the spring from hitting and thus eliminate noise. On each side of the armature plate 20 are nuts 30 and 31 for locking the armature in place on the shaft 21. The nuts 30 and 31 are provided on their outer periphery with threads corresponding to the pitch of the springs, and the springs are respectively threaded on these nuts 30 and 31 to prevent turning of the springs. The upper spring 23 is also tapered with its smaller end adjacent the armature plate 20 and this spring 23 is preferably a stronger spring than the lower spring 18.

The magnet is also resiliently mounted by means of springs 35 which support the magnet on a base 36. The base 36 is in turn resiliently mounted on a yieldable support 37 and in the corners of the support 37 are provided rubber supports 38 extending toward the base plate 36. Flanges 40 are fixed to the uprights 16 and in these flanges, as well as in the base 36, are provided studs 39 for holding the ends of the springs in place. The studs are threaded to receive the springs which are threaded thereon. The magnet is thus resiliently supported relative to the base 36 and inasmuch as the studs 39 are short and do not extend through the flanges 40 to the base 36, the vibration of the structure to a major degree is eliminated.

By mounting the saw 1 so that it is reciprocated between the upper spring 44 and the springs 18 and 23 it will be understood that an accurate adjustment of the reciprocating saw in synchronism with the alternating current may be had as well as acquiring the desired length of stroke of the saw while so synchronized. It will also be seen that if a blade is broken the same blade may be used until too short for practical purposes. For example, if the blade should break near the shaft 21, or in fact in any place, the shaft 43 could be lowered so that the remaining portion could be clamped to the shaft 21.

A bracket 53 is mounted on the frame by screws to support a switch 54, the button of which projects through an opening provided in the housing 2. The switch and magnet are wired in the usual manner the wire 55 leading from the source of energy.

Complete operation of the device is as follows: As previously stated an alternating current is used which periodically energizes the magnet thus causing the armature plate 20 to be periodically drawn thereto. Upon such movement the spring 18 is compressed and a force stored therein which moves the armature plate 20 upwardly when the magnet is de-energized and upon so doing compresses the spring 23. The tension on the spring 23 determines the travel of the armature and consequently the travel of the saw blade. The springs 18 and 23 accordingly maintain the shaft 21 and the attached saw 1 in a state of reciprocatory vibration, synchronous with the alternating current. The upward movement of the shaft 21 permits the spring 44, which is under tension between the shaft 43 and retainer 45, to close and contribute to the upward movement of the saw blade 1.

By resiliently mounting the housing 2 on the spring plate 37 having the rubber feet 38, it will be understood that the work supporting table 5 therefor so mounted, yieldably supports the work and eliminates vibration to a large degree.

By resiliently mounting the magnet on the resilient support 35 noise is to a large degree eliminated and it will be seen that the magnet itself will have a reciprocating movement in relation to the armature.

Having thus fully described our invention, what we claim and desire to secure by Letters Patent of the United States is—

1. A jig saw comprising an electro-magnet provided with a core having a recess, a plate forming an armature for the electro-magnet, a rod extending through the plate, a nut on the rod on each side of the plate and engaging the plate therebetween, each nut being provided with a threaded exterior, a spring positioned in the recess in the electro-magnet core and threaded onto one nut, a second spring threaded onto the other nut and extending about the rod, a stationary guide member through which the rod is movable and forming a seat for the spring and a saw blade attached to said rod.

2. A jig saw comprising a saw blade mounted for reciprocable movement, a table through which the saw blade extends, a supporting member for the said table having a base, a sheet metal supporting plate having an upwardly curved portion at the center and secured to the base, cushion members secured to the sheet metal supporting plate and extending toward the base of said supporting member and arranged to be engaged by the said base of the supporting member upon tilting movement thereof, a magnet having an armature positioned in the supporting member, spring means resiliently supporting the magnet in respect to the sheet metal supporting plate, spring means at the upper end of the saw blade placed under tension in reciprocation of the blade, spring means between the lower end of the saw blade and the armature, and means for adjusting the tension of said last named spring means.

JULIUS C. LOWRY.
ORA M. RYBOLT.